(12) United States Patent
Roffman et al.

(10) Patent No.: US 6,802,607 B2
(45) Date of Patent: Oct. 12, 2004

(54) PROGRESSIVE CYLINDER OPHTHALMIC LENSES

(75) Inventors: Jeffrey H. Roffman, Jacksonville, FL (US); Ganesh Kumar, Jacksonville, FL (US); Timothy R. Poling, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/284,702

(22) Filed: Oct. 31, 2002

(65) Prior Publication Data

US 2004/0085512 A1 May 6, 2004

(51) Int. Cl.[7] .................................................. G02C 7/06
(52) U.S. Cl. .................................... 351/169; 351/176
(58) Field of Search ........................ 351/169, 176, 351/160 R, 160 H, 161, 168; 623/6.24, 6.27, 6.28, 6.29, 6.3

(56) References Cited

U.S. PATENT DOCUMENTS

| | | | |
|---|---|---|---|
| 3,960,442 A | 6/1976 | Davis et al. ................ | 351/176 |
| 4,580,882 A | 4/1986 | Nuchman et al. ........... | 351/161 |
| 4,861,152 A | 8/1989 | Vinzia et al. ............... | 351/161 |
| 4,976,534 A | 12/1990 | Miege et al. ............... | 351/161 |
| 5,530,491 A | 6/1996 | Baude et al. ............... | 351/169 |
| 5,864,379 A | 1/1999 | Dunn .......................... | 351/161 |
| 6,030,077 A | 2/2000 | Sawano et al. ............. | 351/161 |
| 6,106,118 A | 8/2000 | Menezes et al. ............ | 351/169 |
| 6,142,625 A | 11/2000 | Sawano et al. ............. | 351/161 |
| 6,260,966 B1 | 7/2001 | Sawano et al. ............. | 351/161 |
| 6,322,213 B1 | 11/2001 | Altieri et al. ............... | 351/161 |
| 6,390,623 B1 | 5/2002 | Kokonaski et al. ......... | 351/169 |
| 6,496,253 B1 * | 12/2002 | Vokhmin ..................... | 356/124 |
| 2002/0196410 A1 * | 12/2002 | Menezes ..................... | 351/168 |

FOREIGN PATENT DOCUMENTS

| | | |
|---|---|---|
| EP | 0 949 529 A2 | 10/1999 |
| WO | WO 02/21194 A2 | 3/2002 |

OTHER PUBLICATIONS

PCT International Search Report, dated Mar. 24, 2004, for PCT Int'l. Appln. No. PCT/US03/33181.
U.S. patent application Ser. No. 10/284,613, Roffman et al.
U.S. patent application Ser. No. 10/285,054, Roffman et al.

* cited by examiner

Primary Examiner—Jordan M. Schwartz
(74) Attorney, Agent, or Firm—Lois Gianneschi

(57) ABSTRACT

The invention provides methods for designing lenses useful for correcting astigmatism in which there is a progressive cylinder power. The lens of the invention permits the cylinder power to act under low luminance situations to a different extent than in higher luminance situations eliminating the need for extra toric minus power that may interefere near vision at mid range luminances while assisting distance vision at low luminance conditions.

29 Claims, 3 Drawing Sheets

PROGRESSIVE CYLINDER OPHTHALMIC LENSES

FIELD OF THE INVENTION

The invention relates to ophthalmic lenses. In particular, the invention provides lenses that use a progressive cylinder power.

BACKGROUND OF THE INVENTION

Astigmatism, caused by either an unequal radius of curvature of the cornea in all directions or unequal bending of light by the crystalline lens, is a common refractive error. The result of astigmatism is that the eye cannot focus rays of light on the retina because the rays are not refracted equally in all directions. To correct astigmatism, it is common to incorporate cylinder correction of a specific power and axis in the astigmatic individual's ophthalmic lens.

Typically, the cylinder power for a lens is fixed. However, a multifocal lens in which the cylinder power is different for areas of different refractive power is known, as for example in U.S. Pat. No. 6,142,625. The lens of U.S. Pat. No. 6,142,625 is disadvantageous in that there would be image jump in the lens resulting from the difference in power, axis, or both between adjacent areas of the lens. Therefore, a need exists for a variable cylinder lens which overcomes this disadavantage.

DETAILED DESCRIPTION OF THE INVENTION AND PREFERRED EMBODIMENTS

Figure 1:
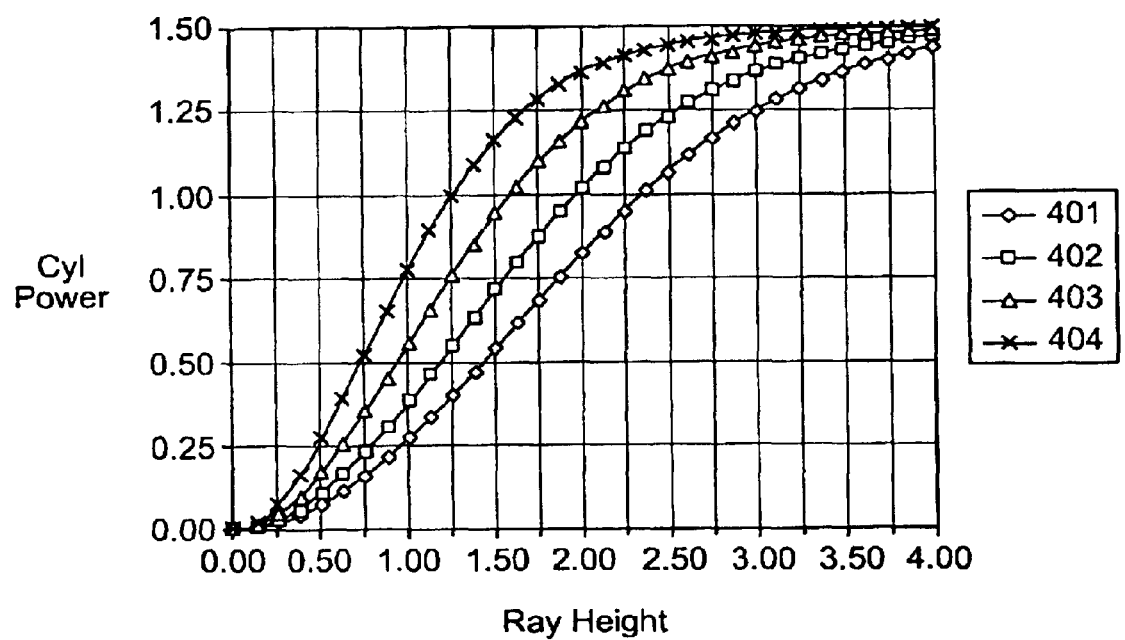
FIG. 1 is a graphical depiction of cylinder power progression for lenses of the invention.

The invention provides methods for designing lenses useful for correcting astigmatism, lenses incorporating such designs, and methods for producing these lenses. The design of the invention provides a smooth, continuous change in cylinder power across the lens. Additionally, the lens of the invention is advantageous in that it permits the cylinder power to act under low luminance situations to a different extent than in higher luminance situations. Thus, the lens eliminates the need for additional toric minus power that may interefere with near vision at mid range luminances while assisting distance vision at low luminance conditions.

In one embodiment, the invention provides an ophthalmic lens comprising, consisting essentially of, and consisting of a progressive cylinder power. By ophthalmic lens is meant a spectacle, contact, intraocular lens, and the like. Preferably, the lens of the invention is a contact lens. By "progressive cylinder power" is meant that there is a continuous, progressive change in cylinder power from the optical center of the lens to the periphery of the optic zone. The cylinder power may increase or decrease as one moves from the optical center to the periphery.

In an alternative embodiment, the invention provides an ophthalmic lens comprising, consisting essentially of, and consisting of a progressive cylinder power and a progressive axis. By "progressive axis" is meant that the axis of the cylinder power continuously changes over a defined range as one moves from the optical center of the lens to the periphery of the optic zone. The cylinder axis may increase or decrease as one moves from the optical center to the periphery.

The progressive cylinder power, progressive axis, or both may be incorporated into a single vision lens, but will find greatest utility in multifocal lenses, or lenses with more than one focal power. Examples of such lens include, without limitation, bifocals, such as aspeherics, conics, concentrics, translating, and multiple annular designs, diffractive lenses, progressive additions lenses and the like.

The cylinder power of the lens may be varied according to the following equation:

$$y = \left[\left[\frac{8A^3}{4A^2 + P(X+K)^2} \times Cyl\right]^s\right] \quad (I)$$

wherein y is the instantaneous cylinder power at any point x on the lens;
P controls the width of the cylinder power region of the lens and is a value greater than 0, preferably 1;
A is a constant, preferably 0.5;
K controls displacement of the peak cylinder power and may be a value from +4 to −4;
S controls the functions endpoints and may be a value from 1 to 50; and
Cyl is the maximum cylinder power of the lens.

Equation I provides a progressive cylinder power that decreases as it moves from the center of the optic zone, or optical center of the lens, to the lens periphery.

A progressive cylinder power that increases as it moves from the center of the optic zone, or optical center of the lens, to the lens periphery may be provided by the following equation:

$$y = Cyl - \left[\left[\frac{8A^3}{4A^2 + P(X+K)^2}\right]^s \times Cyl\right] \quad (II)$$

wherein the values and definitions for y, A, P, X, K and Cyl are the same as for Equation I. In FIG. 1 is a graphical depiction of progressive cylinder power profiles obtained using Equation II. Table 1 below lists the values used for A, P, X, K for the progressions of FIG. 1.

TABLE 1

| Progression | A | K | P | S |
| --- | --- | --- | --- | --- |
| 401 | 0.50 | 0.0 | 0.002 | 100.0 |
| 402 | 0.50 | 0.0 | 0.030 | 10.0 |
| 403 | 0.50 | 0.0 | 0.080 | 6.0 |
| 404 | 0.50 | 0.0 | 0.200 | 4.0 |

Yet another equation useful for providing progressive cylinder power is:

$$y = ((1-P)^x) \times Cyl \quad (III)$$

wherein:
y is the instantaneous cylinder power at any point x;
P is the pupil fraction and may be any value from 0 to 1;
x is a value of 0.0 to 20; and
Cyl is the maximum cylinder power.
Equation III provides for decreasing cylinder power as one moves from the center of the optic zone. The following equation provides for increasing power:

$$y = Cyl - ((1-P)^x) \times Cyl \quad (IV)$$

Yet another equation that is useful in providing progressively decreasing power from the center of the optic zone is:

$$y=|\text{Sin}(P)^x|\times Cyl \quad (V)$$

and for increasing cylinder power:

$$y=Cyl-|\text{Sin}(P)^x|\times Cyl \quad (VI)$$

wherein y is the instantaneous cylinder power at any point x of the lens;
P is the pupil fraction and is 90 to 180 degrees;
x is a value from 0.0 to 20; and
Cyl is the maximum cylinder power of the lens.

Yet additional examples of equations that may be used to design a progressive cylinder power that decreases from the center of the optic zone to the periphery are:

$$y = Cyl \times \left( \frac{1}{(a \times (1+(x/x_c)^{2n}))} \right) \quad (VII)$$

$$y = Cyl \times \left( \frac{1}{(a \times (1+(x/x_c)^2) \times n)} \right) \quad (VIII)$$

and $$y = Cyl \times \left( \frac{1}{(a \times (1+(x/x_c)^d) \times n)} \right) \quad (IX)$$

in each of which, wherein:
y is the instaneous cylinder power at any point x;
$x_c$ is the 50% cutoff in the filter transition, or position in x with ½ of the cylinder peak power;
a is a constant and preferably is 1;
n controls the steepness of the transition and is a value of 1 to 40;
Cyl is the maximum cylinder power; and
X is the instantaneous semidiameter, of the x position distance from the center of the lens.

Additional examples of equations that may be used to design a progressive cylinder power that increases from the center of the optic zone to the periphery are:

$$y = Cyl - Cyl \times \left( \frac{1}{(a \times (1+(x/x_c)^{2n}))} \right) \quad (X)$$

$$y = Cyl - Cyl \times \left( \frac{1}{(a \times (1+(x/x_c)^2) \times n)} \right) \quad (XI)$$

and $$y = Cyl - Cyl \times \left( \frac{1}{(a \times (1+(x/x_c)^d) \times n)} \right) \quad (XII)$$

in each of which, wherein:
y is the instaneous cylinder power at any point x;
$x_c$ is the 50% cutoff in the filter transition, or position in x in which the cylinder power is ½ of the peak;
a is a constant and preferably is 1;
n controls the steepness of the transition and is a value of 1 to 40;
Cyl is the maximum cylinder power; and
X is the instantaneous semidiameter.

Figure 2:
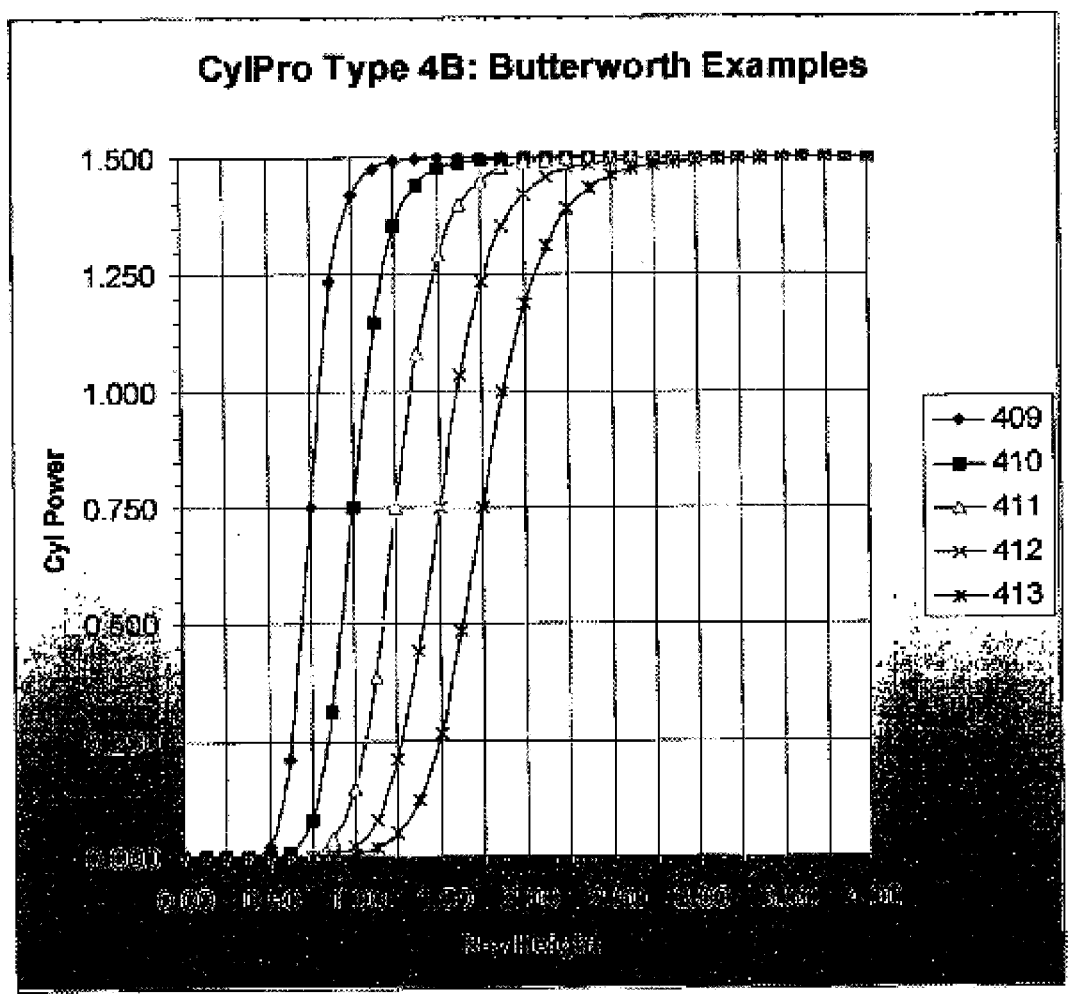
FIG. 2 is another graphical depiction of cylinder power progression for lenses of the invention.
Figure 3:
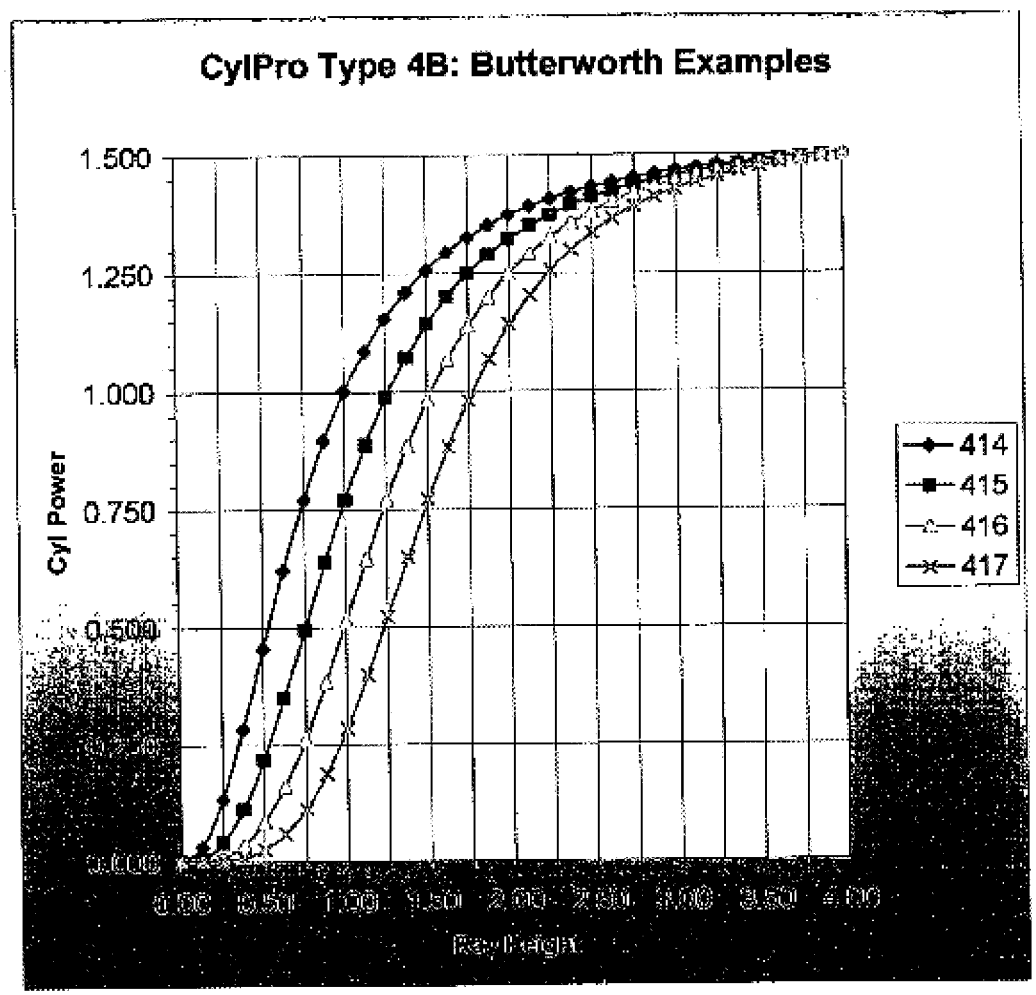
FIG. 3 is another graphical depiction of cylinder power progression for lenses of the invention.

In FIGS. 2 and 3 are depicted graphical representations of cylinder power progressions provided using Equation VII. In Table 2 is listed the values of $X_c$, a, n, and Cyl used for each of the progressions.

TABLE 2

| Progression | $X_c$ | a | n | Cyl |
|---|---|---|---|---|
| 409 | 0.75 | 1.0 | 5.0 | 1.50 |
| 410 | 1.00 | 1.0 | 5.0 | 1.50 |
| 411 | 1.25 | 1.0 | 5.0 | 1.50 |
| 412 | 1.50 | 1.0 | 5.0 | 1.50 |
| 413 | 1.75 | 1.0 | 5.0 | 1.50 |
| 414 | 0.75 | 1.0 | 1.073 | 1.50 |
| 415 | 1.00 | 1.0 | 1.30 | 1.50 |
| 416 | 1.25 | 1.0 | 1.55 | 1.50 |
| 417 | 1.50 | 1.0 | 1.83 | 1.50 |

In embodiments of the lens of the invention in which the progressive cylinder power is used in a progressive addition lens, the cylindrical power change is distinct from that of the progressive addition power change, meaning that the progression of add power is independent of the cylinder power progression. The lens may have the progressive addition power on one surface with the progressive cylinder power on the opposite surface or they may be on the same surface. Preferably, the progressive cylinder power is on the back, or eye side, surface and the progressive addition power is on the opposite surface.

In one embodiment, the invention may be used to provide lenses with cylinder power customized to the different tasks of the wearer. For example, the cylinder power may be made higher for distance oriented tasks and lower for near and intermediate distance tasks. One manner in which this can be achieved is by providing a lens with an add power that peaks in the center and decreases as one moves radially to the lens periphery and have a cylinder power that is low or 0 at the center of the lens and increases to the peak cylinder power as one moves radially toward the lens periphery.

One ordinarily skilled in the art will recognize that for contact lens embodiments, due to the presence of the cylinder power, a stabilization means will need to be incorporated in the lens. Suitable stabilization means are any of the static and dynamic stabilization means known in the art including, without limitation, prism ballast, thin and thick zones, bosses and the like and combinations thereof.

The lenses if the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred contact lens material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in Attorney Docket Number VTN 588, U.S. Ser. No. 60/363,630 incorporated herein in its entirety by reference.

As yet another alternative, the lens material may be any material suitable for forming ophthalmic lens other than contact lenses. For example, spectacle lens materials may be used including, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, and the like and combinations thereof. Additionally, materials for forming intraocular lenses include, without limitation, polymethyl methacrylate, hydroxyethyl methacrylate, inert clear plastics, silicone-based polymers, and the like and combinations thereof.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

What is claimed is:

1. An ophthalmic lens, comprising an optic zone having a periphery and an optic center and a cylinder power for correcting astigmatism, wherein the cylinder power continuously and progressively changes from the optical center of the lens to the optic zone periphery.

2. The lens of claim 1, wherein the lens is a contact lens.

3. The lens of claim 2, wherein the lens is a single vision lens.

4. The lens of claim 2, wherein the lens is a multifocal lens.

5. The lens of claim 1, wherein the progressive cylinder power varies according to the following equation:

$$y = \left[\left[\frac{8A^3}{4A^2 + P(X+K)^2} \times Cyl\right]^S\right]$$

wherein y is an instantaneous cylinder power at any point x on the lens;

P is a value greater than 0;

A is 0.5;

K is a value from +4 to −4;

S is a value from 1 to 50; and

Cyl is the maximum cylinder power of the lens.

6. The lens of claim 1, wherein the progressive cylinder power varies according to the following equation:

$$y = Cyl - \left[\left[\frac{8A^3}{4A^2 + P(X+K)^2}\right]^S \times Cyl\right]$$

wherein y is an instantaneous cylinder power at any point x on the lens;

P is a value greater than 0;

A is 0.5;

K is a value from +4 to −4;

S is a value from 1 to 50; and

Cyl is the maximum cylinder power of the lens.

7. The lens of claim 1, wherein the progressive cylinder power varies according to the following equation:

$$y = ((1-P)^x) \times cyl$$

wherein:

y is the instantaneous cylinder power at any point x on the lens;

P is a value from 0 to 1;

x is a value of 0.0 to 20; and

Cyl is the maximum cylinder power.

8. The lens of claim 1, wherein the progressive cylinder power varies according to the following equation:

$$y = Cyl - ((1-P)^x) \times Cyl$$

wherein:

y is the instantaneous cylinder power at any point x on the lens;

P is a value from 0 to 1;

x is a value of 0.0 to 20; and

Cyl is the maximum cylinder power.

9. The lens of claim 1, wherein the progressive cylinder power varies according to the following equation:

$$y = |Sin(P)^x| \times Cyl$$

wherein y is the instantaneous cylinder power at any point x of the lens;

P is 90 to 180 degrees;

x is a value from 0.0 to 20; and

Cyl is the maximum cylinder power of the lens.

10. The lens of claim 1, wherein the progressive cylinder power varies according to the following equation:

$$y = Cyl - |Sin(P)^x| \times Cyl$$

wherein y is the instantaneous cylinder power at any point x of the lens;

P is 90 to 180 degrees;

x is a value from 0.0 to 20; and

Cyl is the maximum cylinder power of the lens.

11. The lens of claim 1, wherein the progressive cylinder power varies according to the following equation:

$$y = Cyl \times \left(\frac{1}{(a \times (1 + (x/x_c)^{2n})}\right)$$

wherein:

y is the instaneous cylinder power at any point x on the lens;

$x_c$ is a position in x with ½ of a cylinder peak power of the lens;

a is 1;

n is a value of 1 to 40;

Cyl is the maximum cylinder power; and

X is the instantaneous semidiameter.

12. The lens of claim 1, wherein the progressive cylinder power varies according to the following equation:

$$y = Cyl \times \left(\frac{1}{(a \times (1 + (x/x_c)^2) \times n}\right)$$

wherein:

y is the instaneous cylinder power at any point x on the lens;

$x_c$ is a position in x with ½ of a cylinder peak power of the lens;

a is 1;

n is a value of 1 to 40;

Cyl is the maximum cylinder power; and

X is the instantaneous semidiameter.

13. The lens of claim 1, wherein the progressive cylinder power varies according to the following equation:

$$y = Cyl \times \left( \frac{1}{(a \times (1 + (x/x_c)^d) \times n)} \right)$$

wherein:

y is the instaneous cylinder power at any point x on the lens;

$x_c$ is a position in x with ½ of a cylinder peak power of the lens;

a is 1;

n is a value of 1 to 40;

Cyl is the maximum cylinder power; and

X is the instantaneous semidiameter.

14. The lens of claim 1, wherein the progressive cylinder power varies according to the following equation:

$$y = Cyl - Cyl \times \left( \frac{1}{(a \times (1 + (x/x_c)^{2n}))} \right)$$

wherein:

y is the instaneous cylinder power at any point x on the lens;

$x_c$ is position in x in which the cylinder power is ½ of the peak;

a is 1;

n is a value of 1 to 40;

Cyl is a maximum cylinder power of the lens; and

X is the instantaneous semidiameter.

15. The lens of claim 1, wherein the progressive cylinder power varies according to the following equation:

$$y = Cyl - Cyl \times \left( \frac{1}{(a \times (1 + (x/x_c)^2) \times n)} \right)$$

wherein:

y is the instaneous cylinder power at any point x on the lens;

$x_c$ is position in x in which the cylinder power is ½ of the peak;

a is 1;

n is a value of 1 to 40;

Cyl is a maximum cylinder power of the lens; and

X is the instantaneous semidiameter.

16. The lens of claim 1, wherein the progressive cylinder power varies according to the following equation:

$$y = Cyl - Cyl \times \left( \frac{1}{(a \times (1 + (x/x_c)^d) \times n)} \right)$$

wherein:

y is the instaneous cylinder power at any point x on the lens;

$x_c$ is position in x in which the cylinder power is ½ of the peak;

a is 1;

n is a value of 1 to 40;

Cyl is a maximum cylinder power of the lens; and

X is the instantaneous semidiameter.

17. The lens of claim 1, wherein the cylinder power further comprises a progressive axis.

18. The lens of claim 2, wherein the cylinder power further comprises a progressive axis.

19. The lens of claim 3, wherein the cylinder power further comprises a progressive axis.

20. The lens of claim 4, wherein the cylinder power further comprises a progressive axis.

21. The lens of claim 4, wherein the cylinder power is on a back surface of the lens and wherein a front surface of the lens is a multifocal surface.

22. The lens of claim 1, wherein the cylinder power increases from the optical center of the lens to the optic zone periphery.

23. The lens of claim 2, wherein the cylinder power increases from the optical center of the lens to the optic zone periphery.

24. The lens of claim 3, wherein the cylinder power increases from the optical center of the lens to the optic zone periphery.

25. The lens of claim 4, wherein the cylinder power increases from the optical center of the lens to the optic zone periphery.

26. The lens of claim 1, wherein the cylinder power decreases from the optical center of the lens to the optic zone periphery.

27. The lens of claim 2, wherein the cylinder power decreases from the optical center of the lens to the optic zone periphery.

28. The lens of claim 3, wherein the cylinder power decreases from the optical center of the lens to the optic zone periphery.

29. The lens of claim 4, wherein the cylinder power decreases from the optical center of the lens to the optic zone periphery.

* * * * *